United States Patent [19]

Yunt

[11] 4,447,183
[45] May 8, 1984

[54] MACHINE PARTS EXPANDER HOLD DOWN

[75] Inventor: Fred W. Yunt, Cypress, Calif.

[73] Assignee: Northrop Corporation, Hawthorne, Calif.

[21] Appl. No.: 295,333

[22] Filed: Aug. 24, 1981

[51] Int. Cl.³ .............................................. F16B 13/06
[52] U.S. Cl. ........................................ 411/57; 411/157
[58] Field of Search ................. 411/57, 60, 70, 71, 411/44, 157

[56] References Cited

U.S. PATENT DOCUMENTS

| | | | |
|---|---|---|---|
| 2,120,577 | 6/1938 | Schulte | 411/71 |
| 2,406,157 | 8/1946 | Nelson | 411/15 |
| 4,015,515 | 4/1977 | Murray | 411/57 |
| 4,173,918 | 11/1979 | Piersall | 411/71 X |

*Primary Examiner*—Wayne L. Shedd
*Attorney, Agent, or Firm*—John E. Peele, Jr.; Robert J. Stern; James E. Crawford

[57] ABSTRACT

A workpiece fastening device usable on a machine tool fixture, comprising an elongated tubular body having knurling along the outside of the top end of the body, a taper on the inside thereof, and a plurality of slots extending longitudinally about half the length of the body. A lock washer with a yieldable portion is welded to the bottom end of the body to allow a workpiece to be pulled flush against a fixture. The tubular body is slip-fitted into a through-bore in the workpiece until the lock washer rests upon the fixture, and a bolt having a head taper matching the taper in the tubular body is then inserted through the body and is threadably received in the fixture. Upon tightening of the bolt, the top of the body expands causing the knurling to grippingly engage the bore in the workpiece. After the body is completely wedged in the bore, further tightening of the bolt causes the lock washer to be distorted slightly thereby allowing the workpiece to be pulled flush against the fixture.

5 Claims, 3 Drawing Figures

MACHINE PARTS EXPANDER HOLD DOWN

BACKGROUND OF THE INVENTION

1. Field of the Invention

The present invention relates to an improved hold down device for fastening a workpiece to the surface of a machine tool fixture plate. More particularly, the invention relates to a device that converts a straight through bored hole in the workpiece to temporarily act as a counterbored hole for bolting the workpiece to be machined to the work supporting surface with the head of the hold down bolt recessed.

2. Description of the Prior Art

The method used to attach workpieces to be machined to a work support surface when the heads of the hold down bolts had to be recessed was to counterbore each hole, and often both sides of each hole, when the workpiece was to be worked on both sides. For accuracy, the workpiece must be precisely positioned for both counterboring operations. Thus, the set-up and machining time before actual machining of the workpiece was significant. Particularly, when the workpiece was quite bulky and/or heavy, accidents during turnover of the workpiece may have caused loss of workpieces due to the requirement for multiple handling. The present invention eliminates the counterboring operation for hold down bolts thereby reducing set-up time and increasing productivity.

3. Statement of the Prior Art

The following patent is cited as the most pertinent prior art of which the applicant is aware:

| U.S. PAT. NO. | NAME | DATE |
|---|---|---|
| 2,403,330 | D. C. Benton | 2 July 1942 |

U.S. Pat. No. 2,403,330 to D. C. Benton on "Blind Fastening Bolt and Nut" relates to a bolt, sleeve and nut combination used to attach two plate members together. In operation, the sleeve and nut are placed upon the bolt. Then the assembled bolt unit is inserted through an inline bore extended through a top and bottom plate. After insertion, the head of the bolt rests on the top surface of the top plate and a taper provided on a sleeve extends through the bottom surface of the bottom plate. The nut is provided with a tapered portion conforming to the taper on the sleeve, and the tapered part of the nut is provided with a plurality of slots dividing the tapered end of the nut into sections which spread as the nut is tightened, thereby engaging the bottom surface of bottom plate and drawing the two plates together in a mating relationship.

The only relevance between the above cited patent and the present invention is that each uses a sleeve having a taper located on one end. However, the taper on the sleeve used by Benton is used to spread the serrations located on the nut thereby allowing the nut to pull two parts together while the taper in the sleeve of the present invention provides a means for locking the sleeve in a first part and at the same time provides a shoulder for a bolt head to work against in pulling a second part into a mating relationship with the first part.

BRIEF SUMMARY OF THE INVENTION

This invention affords an efficient and cost saving means for attaching workpieces to be machined to the table of a machine tool when the bolt heads must be recessed to enable access to the workpiece for machining thereof. Non-counterbored holes formed in the workpiece are converted into counterbored holes thereby saving the machine time required to counterbore each tie-down hole in a given workpiece, turn over the workpiece, align same, and counterbore the other side thereof. The improvement in a reusable fastener comprises a tubular body portion having a knurled outer top portion and an inwardly tapered inner portion. Longitudinal slots are cut into the top of the body, extending approximately half the length of the body, and providing bifurcations around the top half of the body. A split ring or spring washer is spot welded to the bottom end of the tubular body with a portion thereof yieldably extending below the body for engagement on the work support surface prior to final seating of the tubular body in the bore. A bolt having a taper on the underside of its head complimentary to the taper in the body portion operates to spread the bifurcations of the body as it is tightened in place.

In use, the tubular body portion of the present invention is slip-fitted into an in-line bore, formed through the workpiece to be machined. The split ring spring, on the bottom end of the tubular body portion rests upon the machine bed or fixture designed to hold the workpiece during its machining operations. Aligned in the table or fixture is a hole threaded to receive a mating bolt. The bolt, having a taper on the underside of its head that matches the taper provided in the top portion of the tubular body, is then inserted through the tubular body and is threadably received in the machine table or fixture. Upon tightening of the bolt, the bifurations located around the top portion of the tubular body are expanded causing the knurling on the outside of the bifurcation to grippingly engage the bore provided in the workpiece. After the tubular body is partially wedged into the bore provided in the workpiece, further tightening of the bolt causes the workpiece to be pulled down to bring the bottom surface thereof into a flush mating relationship with the machine bed or fixture. During pull down, the split ring located on the bottom of the tubular body, and resting in contact with the machine bed or fixture, is urged into the bore provided in the workpiece. The split ring acts as a positive stop during the insertion of the tubular body into the bore, but is yieldable and assures the gripping action of the bifurcations are effective upon pull down of the workpiece into intimate contact with the machine bed. Thus, the workpiece may be machined to a high accuracy taking advantage of the highly planar machine bed. After the workpiece is machined, the bolt is removed from the machine bed or fixture, the tubular body portion can then be pushed out of the bored hole and reused.

An object of the present invention is to provide a reusable device which allows a non-counterbored hole to perform the functions of a counterbored hole.

Another object of the present invention is to provide a hold down assembly with a spring attached to a body portion to enable the assembly to pull a workpiece into intimate engagement with a machine bed.

Although the characteristic features of the present invention are particularly pointed out in the appended claims, the device and method employed will be better understood by reference to the following description taken in conjunction with the accompanying drawings.

DETAILED DESCRIPTION OF THE INVENTION

The present invention in a workpiece hold down or fastener device relates to a fastener device comprising a body portion working cooperatively with a bolt in pulling two parts together where one part is provided with a bore extending therethrough and another part is provided with a mating threaded hole.

Figure 1:
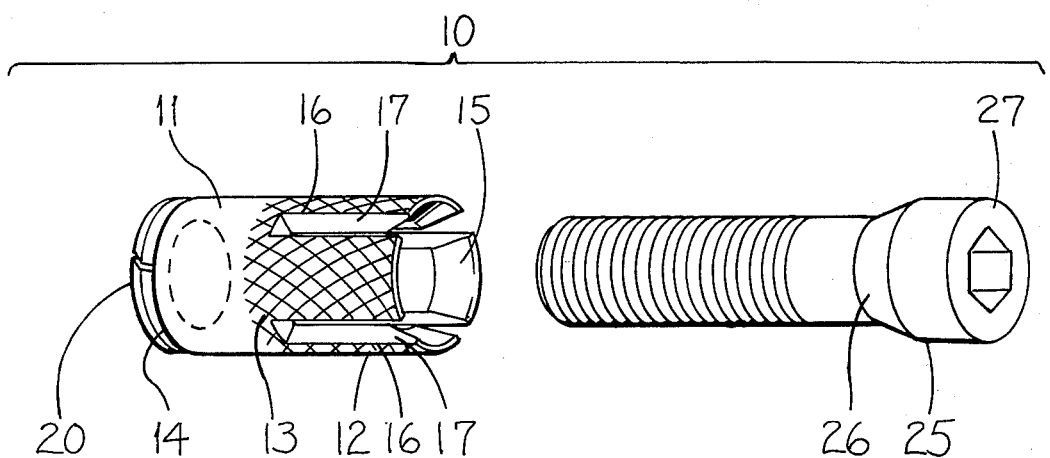
FIG. 1 is a perspective view of the bolt assembly illustrating the present invention.

Referring now to FIG. 1, in a preferred embodiment, a fastening device 10 is shown as a two part assembly which includes a tubular body 11 having a top or second inserted portion 12 and a bottom or first inserted end 14. The top portion 12 of the tubular body 11 is provided on its exterior with a knurled surface 13 and on its interior with a taper 15, which merges into the inner diameter of the tubular body 11. In the top portion 12 of the tubular body 11 are formed a plurality of slots 16 extending longitudinally approximately half the length of the tubular body 11, and thereby providing a plurality of bifurcated portions 17. Each bifurcated portion is covered exteriorly with knurling 13 and interiorly is configured with the inward taper 15.

The first inserted or bottom end 14 of the tubular body 11 is provided with a resilient, split ring 20, preferably in the form of a lock washer, spot welded to the bottom end 14 of the tubular body 11. The free portion of the split ring, substantially diametrically opposed from the welded area, is displaced longitudinally from the tubular body portion when not stressed, but is yieldable, and movable into contact with the body portion. The split ring 20 has an outer diameter less than the inner diameter of the bore 28 and an inner diameter greater than the outer diameter of the bolt 25. The bolt 25 of the clamping device 10 is provided with a taper 26 on the underside of the bolt head 27 that complements the inward taper 15 provided in the top portion 12 of the tubular body 11.

Figure 2:
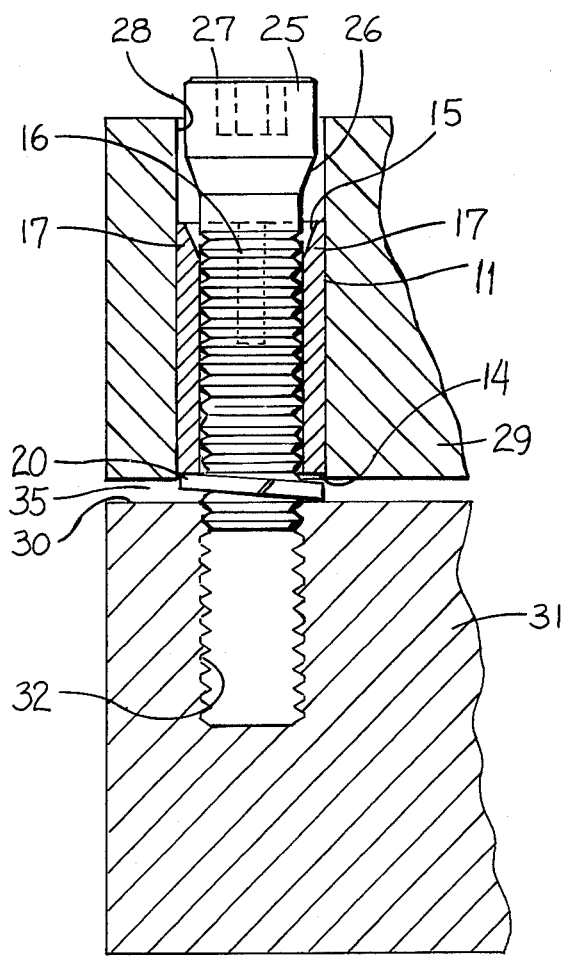
FIG. 2 is a sectional view taken through an assembly according to the present invention after loose assembly.
Figure 3:
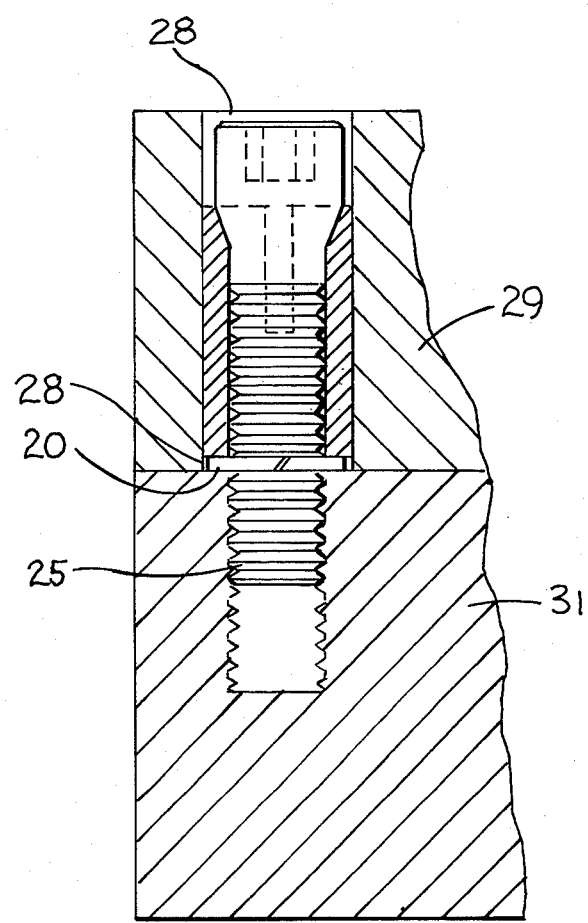
FIG. 3 is a sectional view taken through an assembly according to the present invention after the assembly is tightened.

Referring now to FIG. 2, a typical usage for the present invention 10 is to attach a workpiece to a support table or fixture of a machine tool. The method used is substantially as set forth below.

The tubular body 11 is slipped into an in-line through bore 28 provided in a workpiece 29. The body is seated at a depth such that the resilient ring 20, fixed to the first inserted end 14 of the tubular body 11, contacts a top surface 30 of a fixture plate 31, also having formed therein a tapped hole 32. The bolt 25 is then inserted through the tubular body 11 and the split ring 20, and is threadably received in the tapped hole 32 in the fixture plate 31.

Upon tightening of the bolt 25, the threaded engagement with the tapped hole 32 in the work support cause the bolt 25 to be pulled into the workpiece. After the bolt is recessed slightly below the surface of the workpiece to be machined, cause the taper 26 under the bolt head 27 engages the taper 15 of the tubular body 11 to expand the bifurcations 17 causing the knurling 13 on each bifurcation to grippingly engage the internal wall of bore 28 provided through the workpiece 29. FIG. 2 illustrates the position which the various parts occupy upon initial assembly of the fastening device in the procedure for attaching the workpiece 29 to the fixture 31.

After the tubular body 11 is completely wedged into the the bore 28, further tightening of the bolt 25 causes the tubular body to pull the workpiece 29 and the fixture 31 into a firm and intimate mating relationship thereby closing any gap 35 existing therebetween. While the gap 35 is being closed, the longitudinally displaceable portion of the split ring resilient, means 20 is urged into and recessed in bore 28, compressed against the surface 30 of the fixture. Further, tightening of bolt 25 causes the workpiece to be pulled against the fixture thereby completely closing the gap 35 as the tubular body 11 presses against the split ring 2a, and the latter presses against the work support surface. Thus, the workpiece is brought into intimate engagement with the fixture plate surface permitting highly accurate machining of the workpiece.

After machining, the workpiece 29 is released from one work support surface 30 by removing bolt 29 from the tubular body 11. Upon partial withdrawal of the bolt, the split ring 20 lifts the workpiece from the work support surface 30, Also, the bifurcations of the tubular body withdraw from the bore 28 of the workpiece permitting removal of the tubular body from the workpiece. Hereafter, the fastener 10 is reusable in attaching another workpiece for machining.

The invention has been described as to the structural features of its preferred embodiment.

I claim:

1. A reusuable fastener device for releasably joining a workpiece to a work support surface in a tight relationship comprising:
    a tubular body having two ends, one of the said ends being the first to be inserted into a mating bore in said workpiece to engage said work support surface, the other end being securely and releasably attachable to said workpiece, the tubular body having a length dimension less than the thickness of the portion of the workpiece to be fastened to said work support surface;
    expandable means forming the latter inserted portion of said tubular body, for grippingly engaging said bore provided in said workpiece;
    split ring means on the end of said tubular body being receivable in said bore and having a portion thereof displacable longitudinally relative to said tubular body for establishing the proper depth of insertion of said tubular body into said bore; and
    means insertable into said tubular body, for expanding said latter inserted portion of said tubular body into gripping engagement with said bore and having threaded means thereon for pulling said workpiece into tight mating relationship on said work support surface after said latter portion of said tubular body is expanded into gripping engagement with said bore in said workpiece.

2. The fastener device of claim 1 wherein said expandable means includes a plurality of bifurcations extending around the top portion of said tubular body with an outside surface of each bifurcation provided with knurling and an inside surface of each bifurcation provided with an inward taper portion.

3. The fastener of claim 1 wherein said split ring means is spot-welded to the end of the first inserted portion of said tubular body for engagement with said work support surface.

4. The fastener device of claim 1 wherein said means for expanding said latter portion of said tubular body is a bolt having a taper located on an underside of its head, which taper co-operates with said expandable means located on said latter inserted end of said tubular body causing gripping engagement of said tubular body against said bore wall and for pulling said workpiece and work support surface together in tight mating relationship.

5. The fastener device of claim 1 wherein said split ring means is sufficiently stiff to act as a positive stop during insertion of said tubular body into said bore, and is sufficiently yieldable to permit movement of said displaceable portion against said tubular body end upon pulling of said workpiece into tight mating relationship with said work support surface.

* * * * *